(12) United States Patent
Kawai et al.

(10) Patent No.: US 12,503,203 B2
(45) Date of Patent: Dec. 23, 2025

(54) SENSOR MODULE, AND MARINE VESSEL

(71) Applicant: HONDA MOTOR CO., LTD., Tokyo (JP)

(72) Inventors: Toru Kawai, Saitama (JP); Marudan Kiji, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 168 days.

(21) Appl. No.: 18/476,346

(22) Filed: Sep. 28, 2023

(65) Prior Publication Data

US 2025/0108893 A1 Apr. 3, 2025

(51) Int. Cl.
| | | |
|---|---|---|
| B63B 49/00 | (2006.01) | |
| G01S 17/89 | (2020.01) | |
| H04N 23/13 | (2023.01) | |
| H04N 23/51 | (2023.01) | |

(52) U.S. Cl.
CPC .............. B63B 49/00 (2013.01); G01S 17/89 (2013.01); H04N 23/13 (2023.01); H04N 23/51 (2023.01)

(58) Field of Classification Search
CPC ......... B63B 49/00; B63B 79/40; B63B 79/10; G01S 17/89; G01S 7/4813; G01S 17/86; H04N 23/13; H04N 23/51; F16M 11/00; G01C 21/1652; G01C 21/203; G01C 21/1656; G01C 21/166; G12B 9/00
See application file for complete search history.

(56) References Cited

U.S. PATENT DOCUMENTS

| | | |
|---|---|---|
| 2014/0367537 A1 | 12/2014 | Rudier |
| 2017/0023665 A1 | 1/2017 | Guo |
| 2020/0094783 A1 | 3/2020 | Dubey et al. |
| 2020/0215988 A1 | 7/2020 | Jackson et al. |
| 2021/0063210 A1* | 3/2021 | Krishnan ............... G01D 11/26 |
| 2021/0181606 A1* | 6/2021 | Vitanov .................. G01K 1/08 |
| 2022/0060616 A1 | 2/2022 | Wendel et al. |
| 2022/0150392 A1* | 5/2022 | Maddox ............... A01B 69/001 |
| 2023/0027882 A1* | 1/2023 | McMenamin, Jr . B60W 60/001 |

FOREIGN PATENT DOCUMENTS

FR 2907629 A1 4/2008

OTHER PUBLICATIONS

Partial European Search Report issued Mar. 26, 2025 in the EP Patent Application No. 24203142.5.
Extended European Search Report issued Jul. 29, 2025 in the EP Patent Application No. 24203142.5.

* cited by examiner

Primary Examiner — Thomas Ingram
(74) Attorney, Agent, or Firm — CKC & PARTNERS CO., LLC

(57) ABSTRACT

Provided is a sensor module capable of reducing an assembly error between a plurality of sensors and eliminating the need for measuring a distance between the sensors and the need for a calibration system. A sensor module for shipboard use, detachably mountable to a marine vessel includes a base; a casing that covers the base; a first sensor provided on an upper surface of the base; and a second sensor provided on a lower surface of the base.

17 Claims, 20 Drawing Sheets

FIG. 1
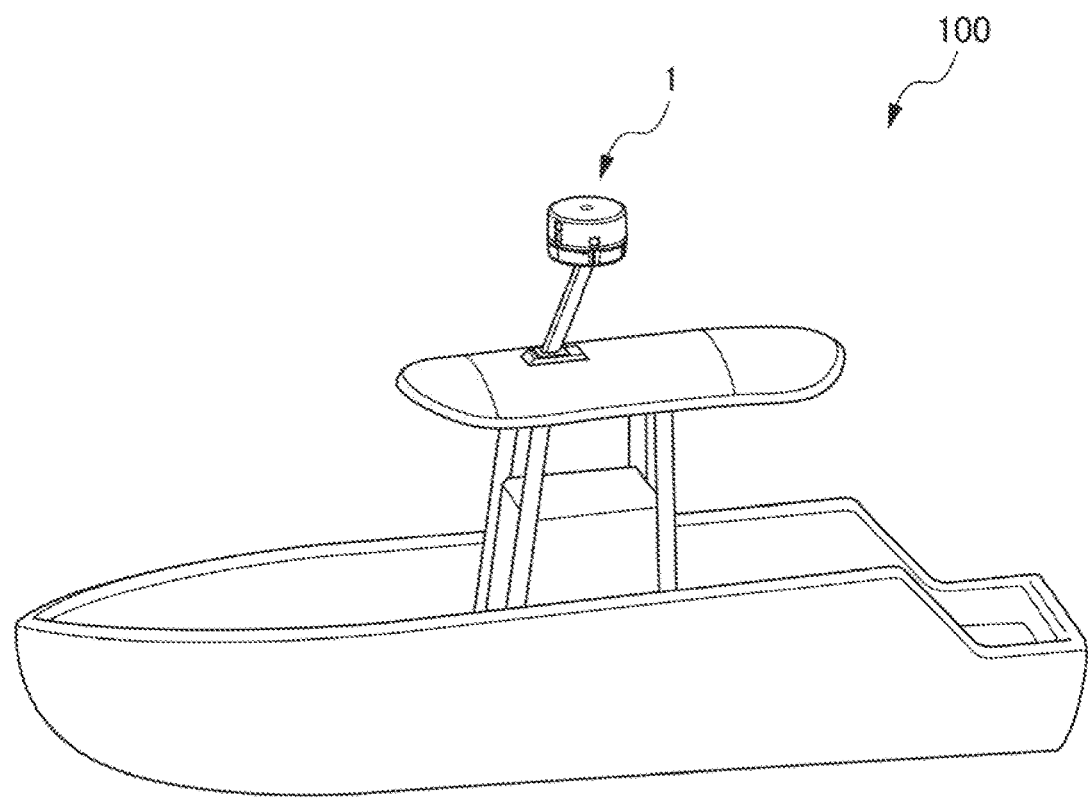
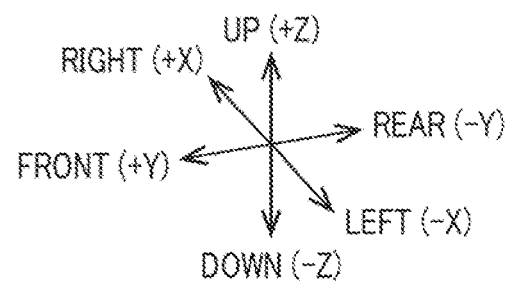

FIG. 13
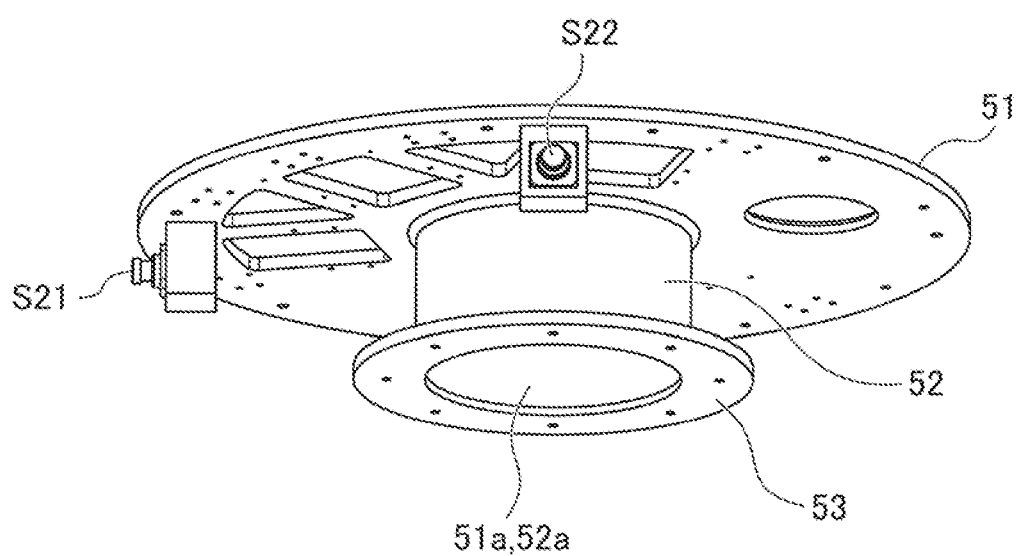
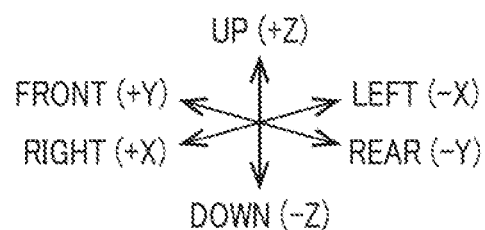

FIG. 17
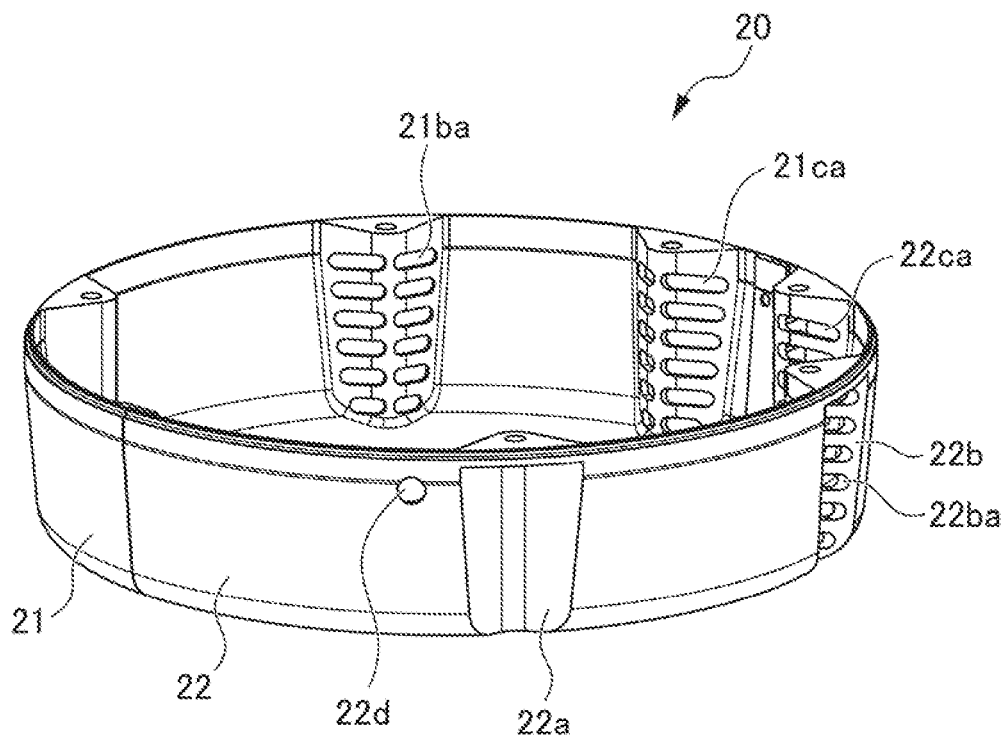
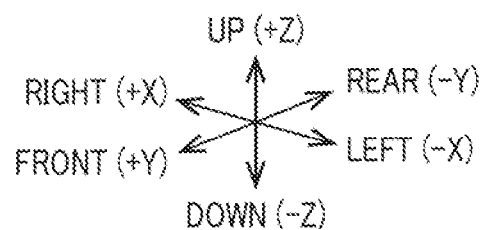

SENSOR MODULE, AND MARINE VESSEL

BACKGROUND OF THE INVENTION

Field of the Invention

The present disclosure relates to a sensor module including a plurality of sensors and to a marine vessel.

Related Art

In recent years, there has been an increasing demand for equipping a marine vessel with various sensors for assistance in maneuvering, automatic maneuvering, and automatic navigation so as to render the marine vessel easy to maneuver for everyone. For example, FR2907629 discloses a sensor arrangement in which a camera is attached to a support plate, an azimuth sensor is attached to an upper plate provided above the camera, and the upper plate is fixed to the support plate.
Patent Document 1: FR2907629

SUMMARY OF THE INVENTION

However, in the configuration disclosed in FR2907629, since the sensors are fixed to two or more different plates, an assembly error may occur between the respective components, and a large assembly error may occur between the plurality of sensors. Specifically, in the configuration of FR2907629, an assembly error between the azimuth sensor and the upper plate, an assembly error between the camera and the support plate, and an assembly error between the upper plate and the support plate occur concurrently. Consequently, the configuration of FR2907629 involves a large assembly error between the azimuth sensor and the camera, and the relative positional relationship between the azimuth sensor and the camera may significantly change due to the influence of the large assembly error. Furthermore, such a large error leads to the need for measurement of the distance between the sensors and the need for a calibration system, which is laborious.

It is an object of the present disclosure to provide a sensor module capable of reducing an assembly error between a plurality of sensors and eliminating the need for measuring a distance between the sensors and the need for a calibration system, and to provide a marine vessel.

The present disclosure achieves the above object by the following solutions. In order to facilitate understanding, the solutions will be described with denotation by reference signs corresponding to those used in an embodiment of the present disclosure, but the present disclosure is not limited to the embodiment.

A first aspect of the present disclosure is directed to a sensor module (1) for shipboard use, the sensor module being detachably mountable to a marine vessel (100, 101) and including: a base (50); a casing (30) that covers the base (50); a first sensor (S11, S12, S13, S14) provided on an upper surface of the base (50); and a second sensor (S21, S22, S23, S24, S25, S26) provided on a lower surface of the base (50).

According to the second aspect of the present disclosure as described in the first aspect, the first sensor (S11, S12, S13, S14) is heavier in weight than the second sensor (S21, S22, S23, S24, S25, S26), and an upper portion of the second sensor (S21, S22, S23, S24, S25, S26) is fixed to the lower surface of the base (50).

According to the third aspect of the present disclosure as described in the first or second aspect, the second sensor (S21, S22, S23, S24, S25, S26) is an imager.

According to the fourth aspect of the present disclosure as described in any one of the first to third aspect, the first sensor (S11, S12, S13, S14) includes a plurality of first sensors, and the second sensor(S21, S22, S23, S24, S25, S26) includes a plurality of second sensors, and in a top view, at least part of the first sensors (S11, S12, S13, S14) and at least part of the second sensors (S21, S22, S23, S24, S25, S26) are arranged axisymmetrically with respect to a virtual line segment extending in a length direction of a marine vessel (100, 101) to which the sensor module (1) is to be mounted and passing through a center of the base (50) in the top view.

According to the fifth aspect of the present disclosure as described in any one of the first to fourth aspect, the first sensor (S11, S12, S13, S14) and the second sensor (S21, S22, S23, S24, S25, S26) are arranged at positions where the first and second sensors do not overlap with each other in a top view.

According to the sixth aspect of the present disclosure as described in any one of the first to fifth aspect, the sensor module includes at least one first ventilation portion (21*ba*, 21*ca*, 22*ba*, 22*ca*) that allows for ventilation on a side wall of the casing.

According to the seventh aspect of the present disclosure as described in the sixth aspect, the first ventilation portion (21*ba*, 21*ca*, 22*ba*, 22*ca*) is provided in a recess (21*b*, 21*c*, 22*b*, 22*c*) that is a portion of the side wall recessed toward an interior of the casing (30).

According to the eighth aspect of the present disclosure as described in the seventh aspect, the recess (21*b*, 21*c*, 22*b*, 22*c*) is arranged below the base (50), at a position where the recess (21*b*, 21*c*, 22*b*, 22*c*) partially overlaps with the base (50) in a top view.

According to the ninth aspect of the present disclosure as described in any one of the sixth to eighth aspect, at least one of the first sensor (S11, S12, S13, S14) or the second sensor (S21, S22, S23, S24, S25, S26) is provided on a front portion of the base (50), the front portion corresponding to a front in a front-rear direction of a marine vessel (100, 101) to which the sensor module (1) is to be mounted, the sensor module including on the side wall of the casing, a second ventilation portion (11, 12, 13, 14) that allows for ventilation, the second ventilation portion (11, 12, 13, 14) being arranged at a position opposite to the at least one of the first sensor (S11, S12, S13, S14) or the second sensor (S21, S22, S23, S24, S25, S26) arranged on the front portion.

According to the tenth aspect of the present disclosure as described in the ninth aspect, the first sensor (S11, S12, S13, S14) includes a plurality of first sensors that are arranged on a circumference in a top view, the second ventilation portion (11, 12, 13, 14) includes a plurality of second ventilation portions that are arranged opposite to the plurality of first sensors (S11, S12, S13, S14), respectively, and the at least one first ventilation portion (21*ba*, 21*ca*, 22*ba*, 22*ca*) includes a plurality of first ventilation portions that are arranged on the circumference on which the plurality of first sensors (S11, S12, S13, S14) are arranged in the top view, and are disposed at positions substantially opposite to the plurality of second ventilation portions (11, 12, 13, 14).

According to the eleventh aspect of the present disclosure as described in the ninth or tenth aspect, the second ventilation portion (11, 12, 13, 14) includes: an external opening (14*a*) that opens at a surface of the side wall of the casing (30); an internal opening (14*b*) that opens more inside the casing (30) than the external opening (14a); an opening side surface (14c) that connects the external opening (14a) to the internal opening (14b) and extends substantially in an up-down direction; and an opening bottom surface (14d) that connects the external opening (14a) to the internal opening (14b) and extends in a direction inclined upward from the external opening (14a) toward the internal opening (14b).

According to the twelfth aspect of the present disclosure as described in any one of the first to eleventh aspect, the first sensor (S11, S12, S13, S14) is a light detection and ranging (LIDAR) sensor.

According to the thirteenth aspect of the present disclosure as described in any one of the first to twelfth aspect, further includes a strut (40) that is attached to the base (50), and has a strut through hole (41a, 42a, 43a, 44a) penetrating through an interior of the strut (40). The base (50) has a through hole (51a) penetrating through the upper surface and the lower surface of the base (50), and the through hole (51a) and the strut through hole (41a, 42a, 43a, 44a) communicate with each other.

According to the fourteenth aspect of the present disclosure as described in any one of the first to thirteenth aspect, the casing (30) includes an upper casing part (10) arranged above the base (50), and a lower casing part (20) arranged below the base (50). An interior of the casing (30) includes an upper chamber (UC) surrounded by the base (50) and the upper casing part (10), and a lower chamber (LC) surrounded by the base (50) and the lower casing part (20). The base (50) has a communication hole (51b, 51c, 51d, 51e) through which the upper chamber (UC) communicates with the lower chamber (LC), the communication hole being formed separately from the through hole (51a).

According to the fifteenth aspect of the present disclosure as described in any one of the eleventh to fourteenth aspect, an inertial measurement unit is provided as a third sensor (S31) on the upper surface of the base (50), and at least one of a plurality of the first sensor (S11, S12, S13, S14) is spaced apart from the third sensor on a virtual line segment extending in a length direction of the marine vessel (100, 101) and passing through a center of the base (50) in a top view.

According to the sixteenth aspect of the present disclosure as described in the fourteenth or fifteenth aspect, the lower casing part (20) has a drain hole (20a) through which the strut (40) penetrates and which opens with a gap between an edge of the drain hole (20a) and the strut (40).

According to the seventeenth aspect of the present disclosure as described in any one of the first to sixth aspect, a relay (61, 62) that relays an electrical connection to at least one of the first sensor (S11, S12, S13, S14) or the second sensor (S21, S22, S23, S24, S25, S26) is arranged on the base (50).

An eighteenth aspect of the present disclosure is directed to a marine vessel (100, 101) equipped with the sensor module (1) according to any one of the first to seventeenth aspects.

The present disclosure provides the sensor module capable of reducing an assembly error between the plurality of sensors.

BRIEF DESCRIPTION OF THE DRAWINGS

FIG. 1 is a perspective view illustrating a marine vessel 100 including a sensor module 1 according to the present disclosure;

FIG. 13 illustrates the base 50 as viewed obliquely from the front lower side;

FIG. 17 illustrates a lower casing part 20 as viewed obliquely from the front upper side;

DETAILED DESCRIPTION OF THE INVENTION

An embodiment for implementing the present disclosure will be described below with reference to the accompanying drawings, etc.

Embodiment

Figure 2:
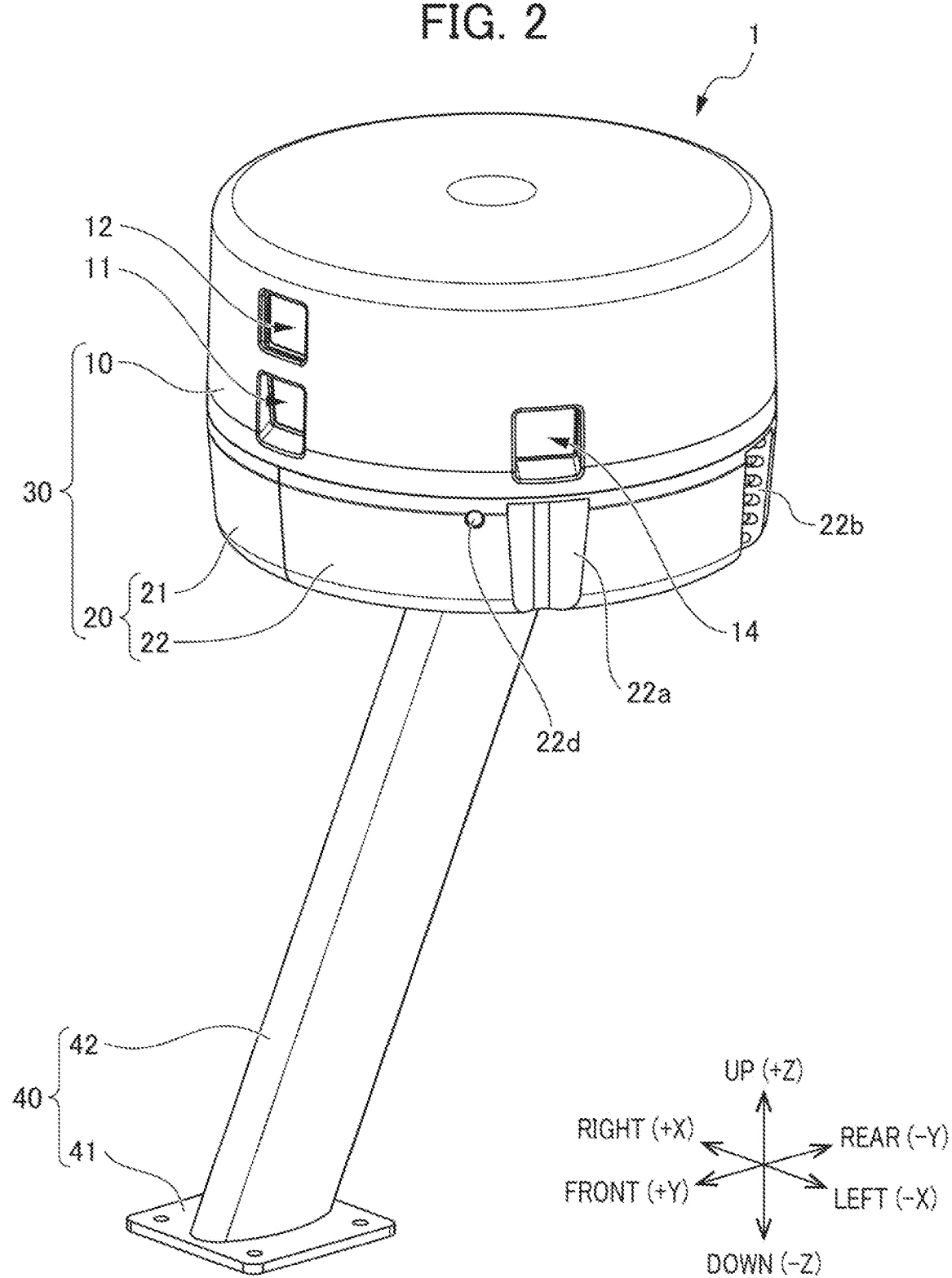
FIG. 2 illustrates the sensor module 1 as viewed obliquely from the front upper side.
Figure 3:
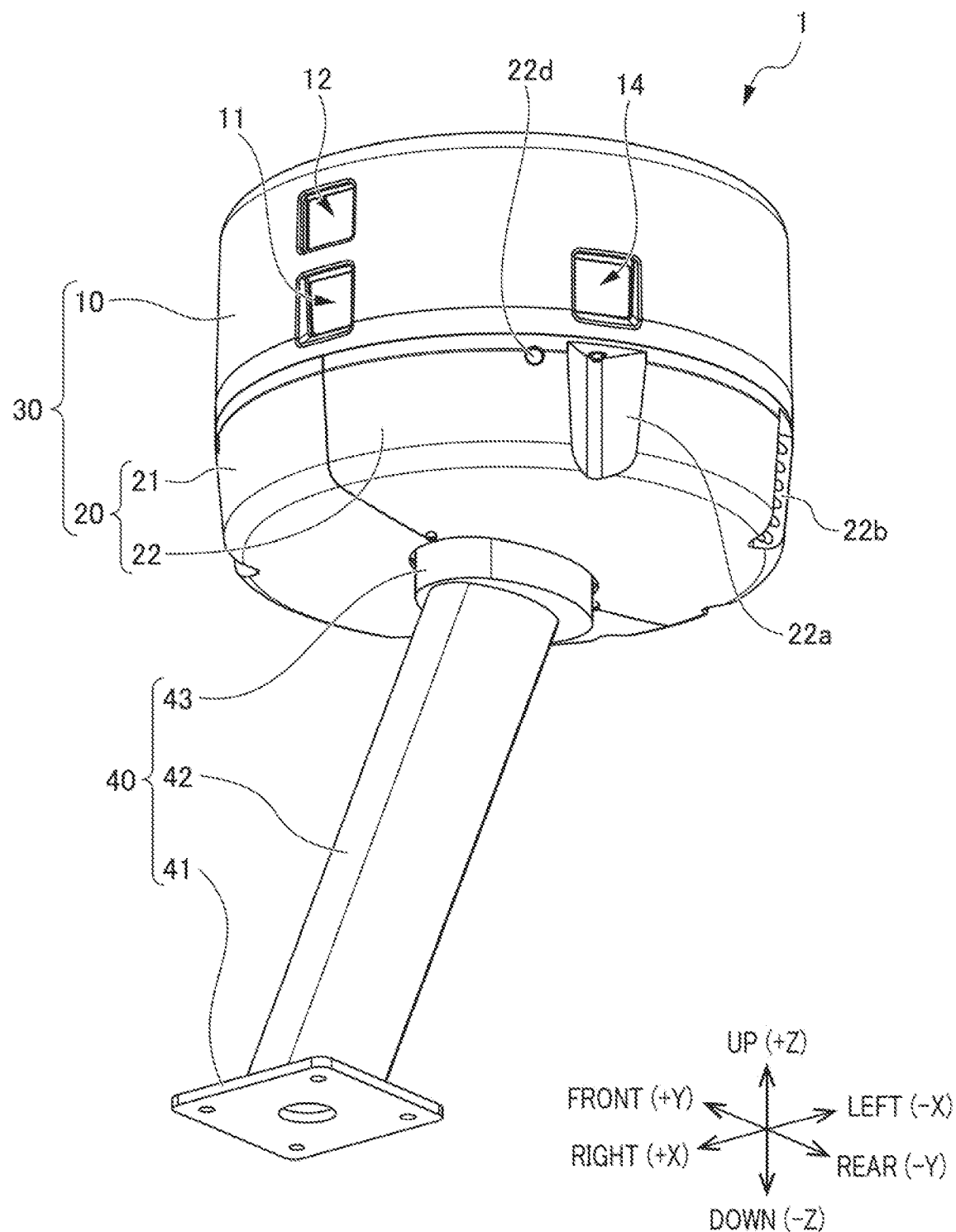
FIG. 3 illustrates the sensor module 1 as viewed obliquely from the front lower side.
Figure 4:
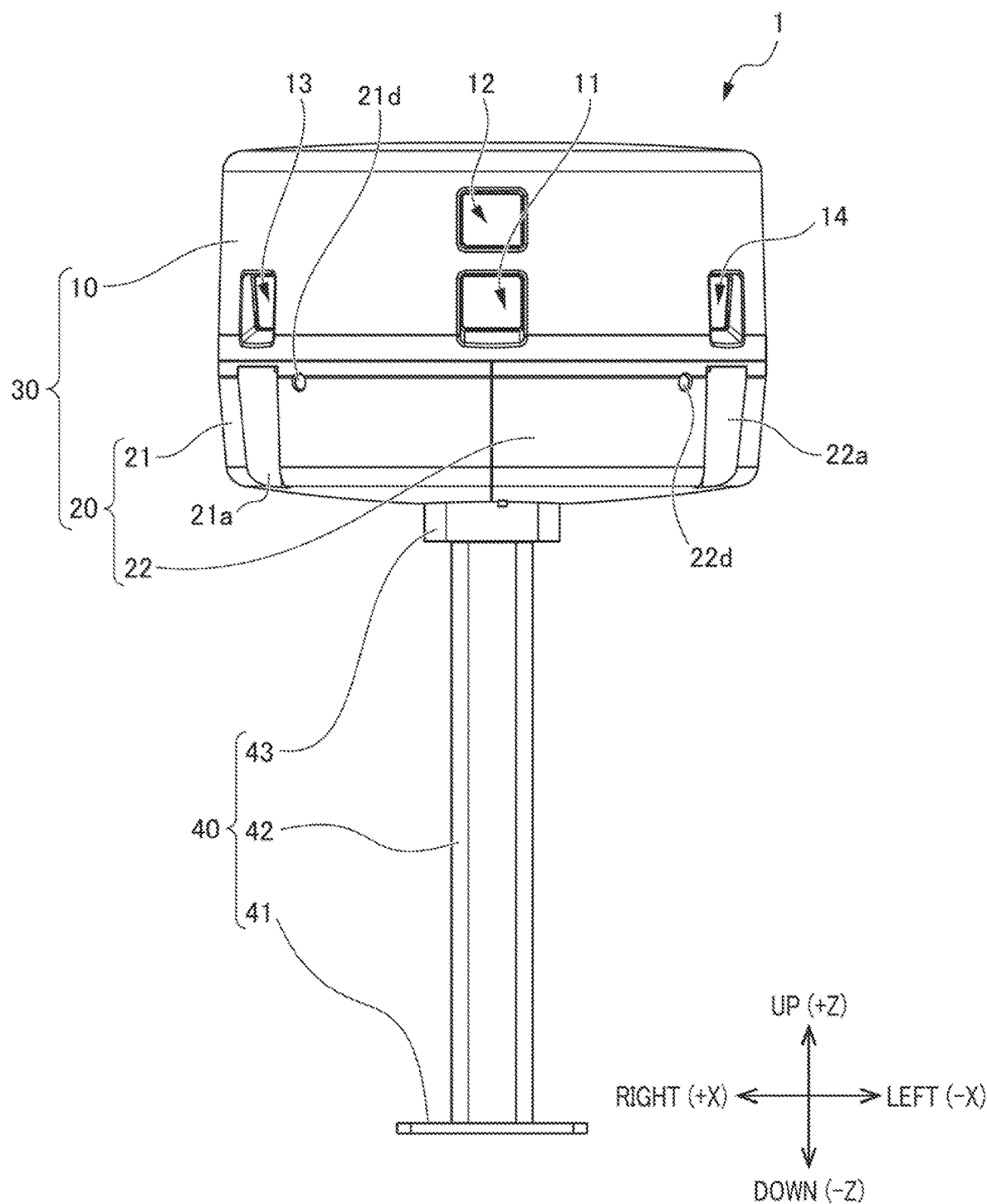
FIG. 4 is a front view of the sensor module 1.
Figure 5:
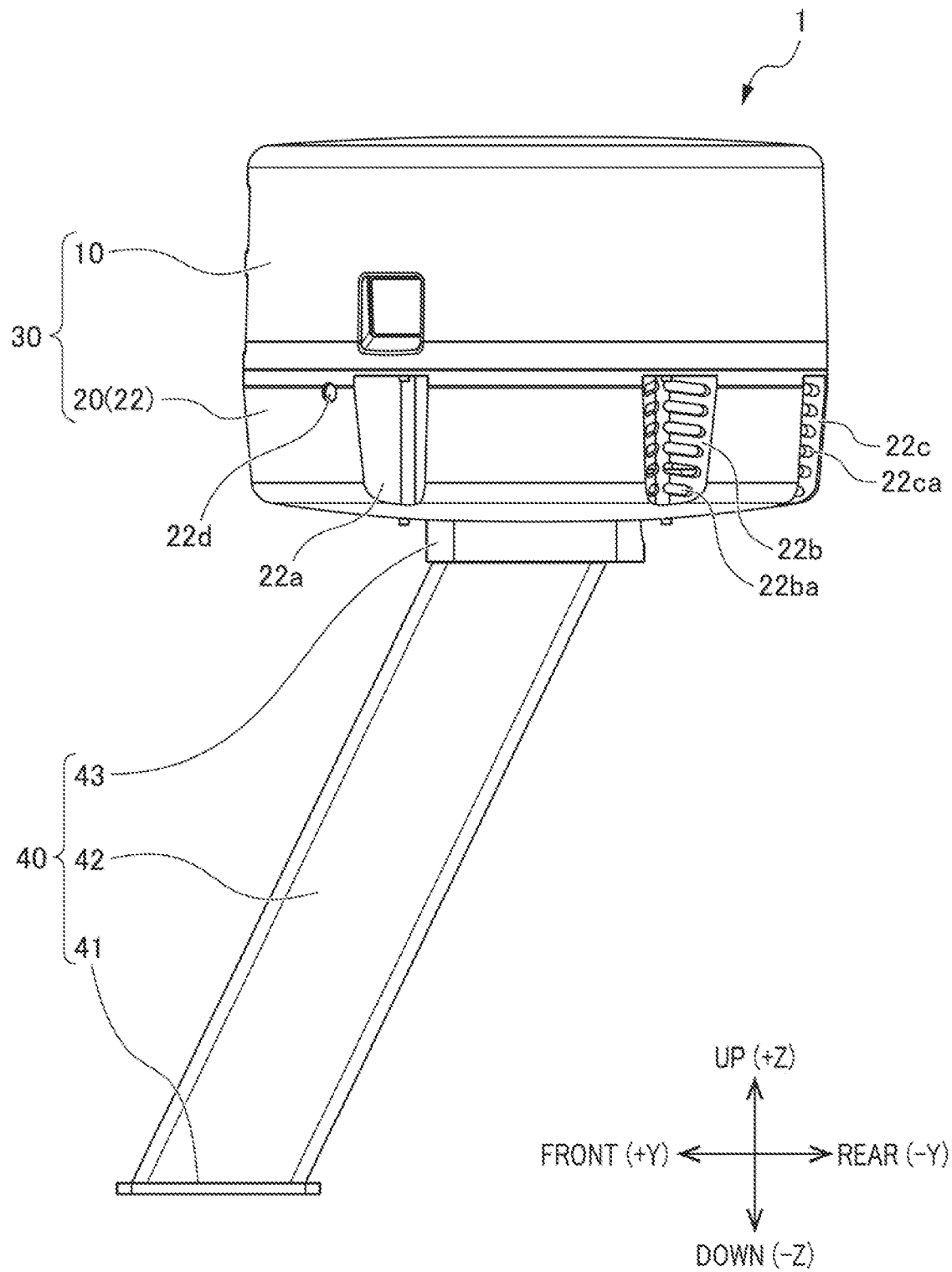
FIG. 5 is a left side view of the sensor module 1.
Figure 6:
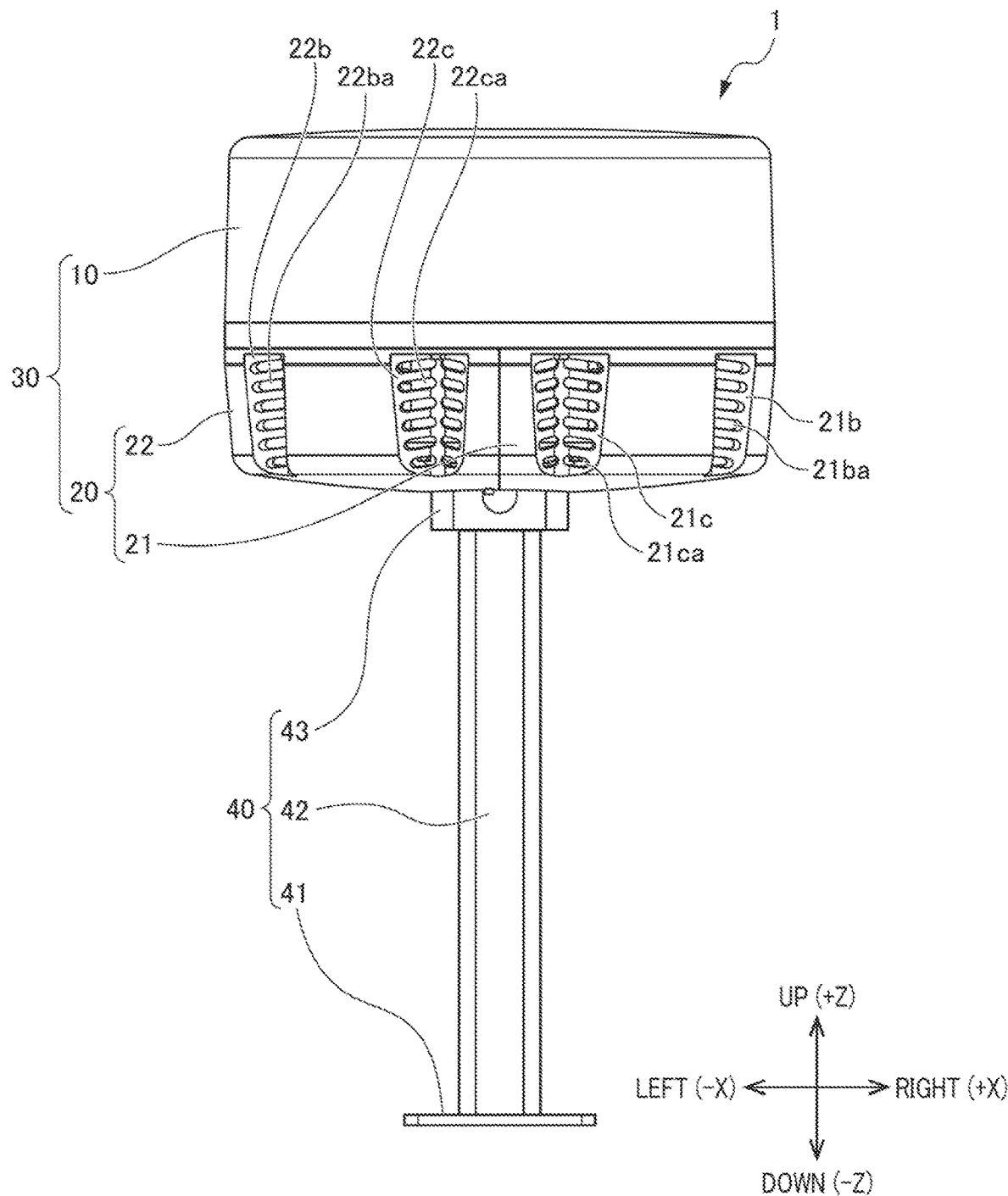
FIG. 6 is a rear view of the sensor module 1.
Figure 7:
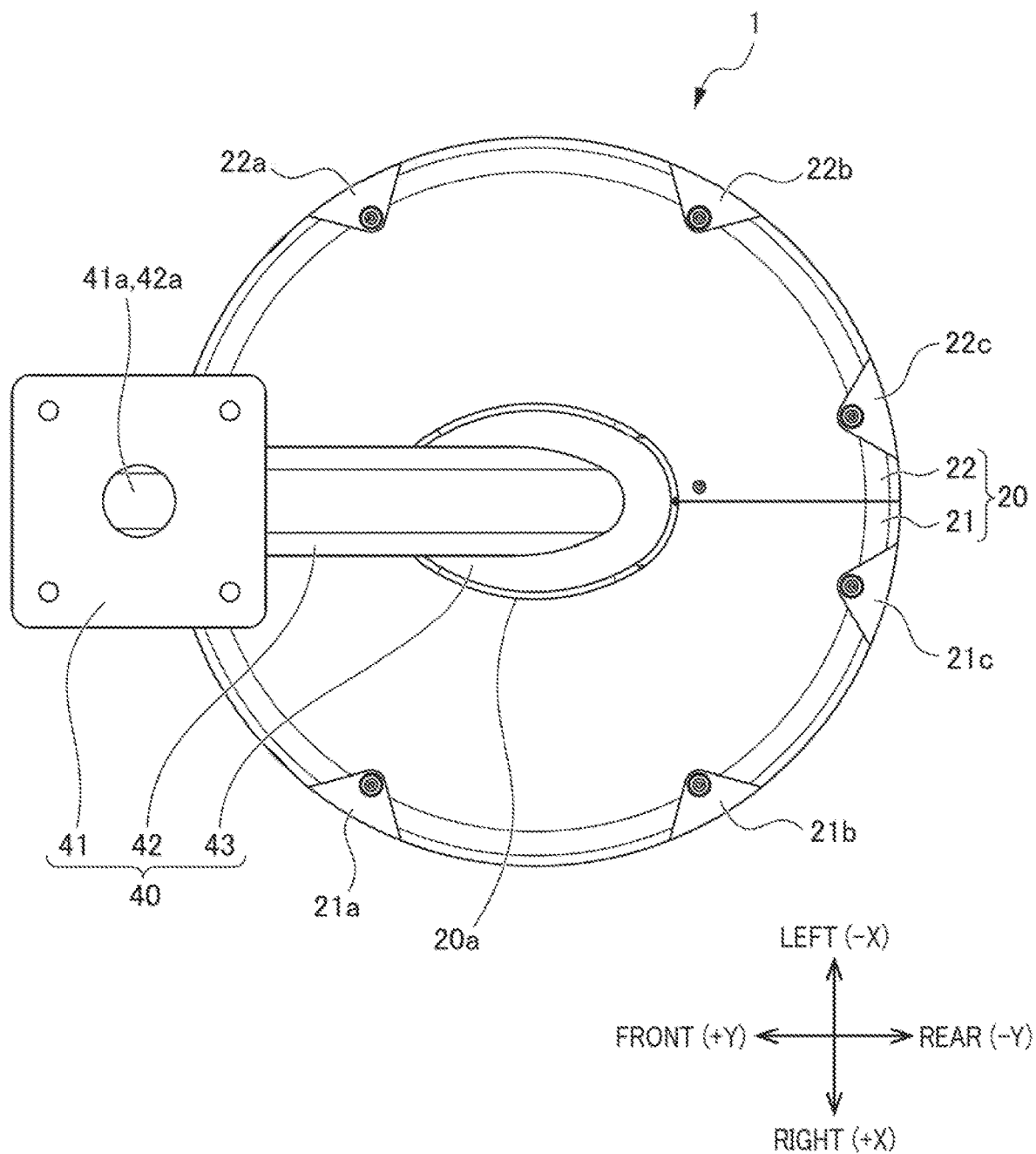
FIG. 7 is a bottom view of the sensor module 1.

FIG. 1 is a perspective view illustrating a marine vessel 100 including a sensor module 1 according to the present disclosure. FIG. 2 illustrates the sensor module 1 as viewed obliquely from the front upper side. FIG. 3 illustrates the sensor module 1 as viewed obliquely from the front lower side. FIG. 4 is a front view of the sensor module 1. FIG. 5 is a left side view of the sensor module 1. FIG. 6 is a rear view of the sensor module 1. FIG. 7 is a bottom view of the sensor module 1. In each drawing, orthogonal coordinates of X, Y, and Z axes are shown for convenience of description. The coordinates are set with reference to the front-rear direction of the marine vessel 100 and the horizontal direction. The X direction corresponds to the left-right direction of the marine vessel 100, the Y direction corresponds to the front-rear direction of the marine vessel 100, and the Z direction corresponds to the up-down direction of the marine vessel 100. More specifically, the front and rear are represented by "+Y" and "−Y", respectively, the left and right are represented by "−X" and "+X", respectively, and the up and down are represented by "+Z" and "−Z", respectively. In the following description, the orientation and the like of each component will be described based on the coordinates, or using the words corresponding to the coordinates, namely, the front, rear, up, down, left, and right.

The sensor module 1 according to the present embodiment is installed, for example, on the top of a roof of the marine vessel 100 such as a boat, as illustrated in FIG. 1. The installation position of the sensor module 1 is not limited to the top of the roof, but is preferably a position that is less susceptible to the influence of an on-board structure, a person, and the like. In outward appearance, the sensor module 1 includes a casing 30 and a strut 40.

The casing 30 includes an upper casing part 10 and a lower casing part 20, and covers a base 50 (to be described later) and various sensors attached to the base 50. In the present embodiment, the casing 30 overall has a substantially cylindrical shape, but the shape of the casing 30 may be changed as appropriate to, for example, a tubular shape with the hexagonal or octagonal top and bottom surfaces.

The upper casing part 10 is provided above the base 50 (toward the +Z side), and defines an upper chamber UC that is a space surrounded by the base 50 and the upper casing part 10. The upper casing part 10 may be formed of, for example, a resin molding.

The lower casing part 20 is provided below the base 50, and defines a lower chamber LC that is a space surrounded by the base 50 and the lower casing part 20. In the present embodiment, in order to enable attachment and detachment of the lower casing part 20 in a state in which the strut 40 is attached to the base 50, the lower casing part 20 is composed of two components, namely, a first lower casing component 21 and a second lower casing component 22.

Figure 8:
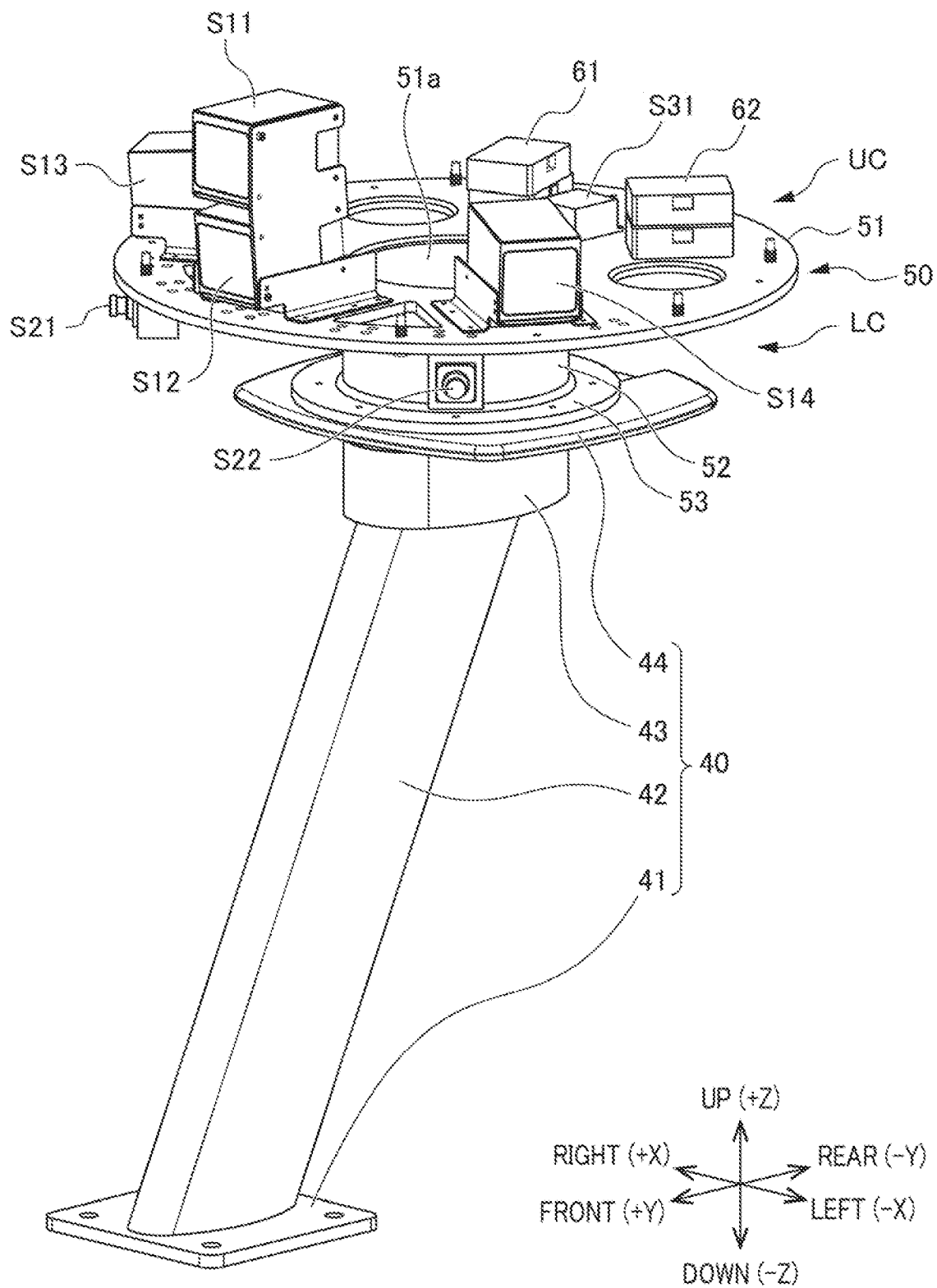
FIG. 8 is a diagram illustrating a state in which a casing 30 has been removed, as viewed obliquely from the front upper side.
Figure 9:
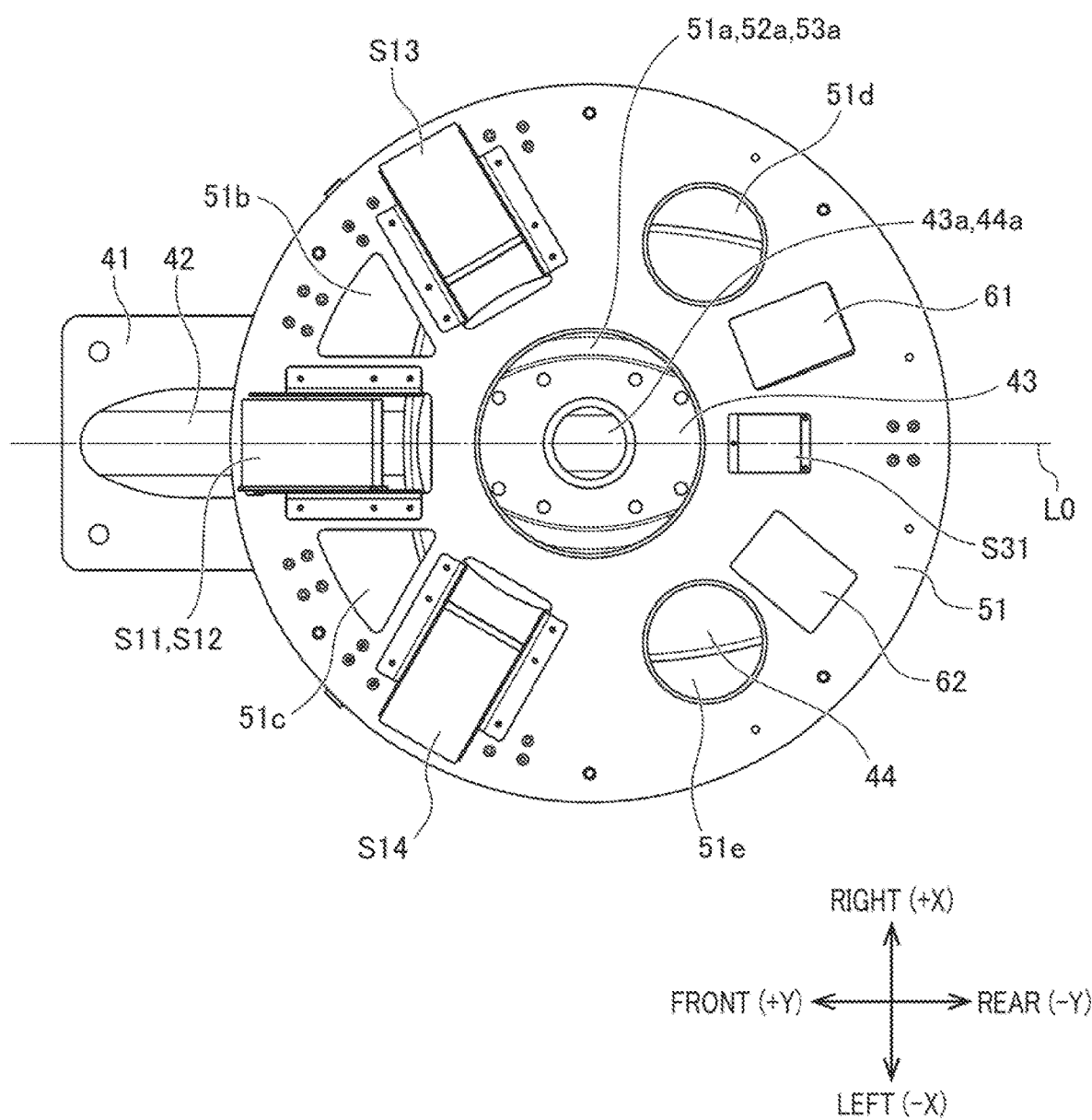
FIG. 9 is a top view illustrating the state in which the casing 30 has been removed.
Figure 10:
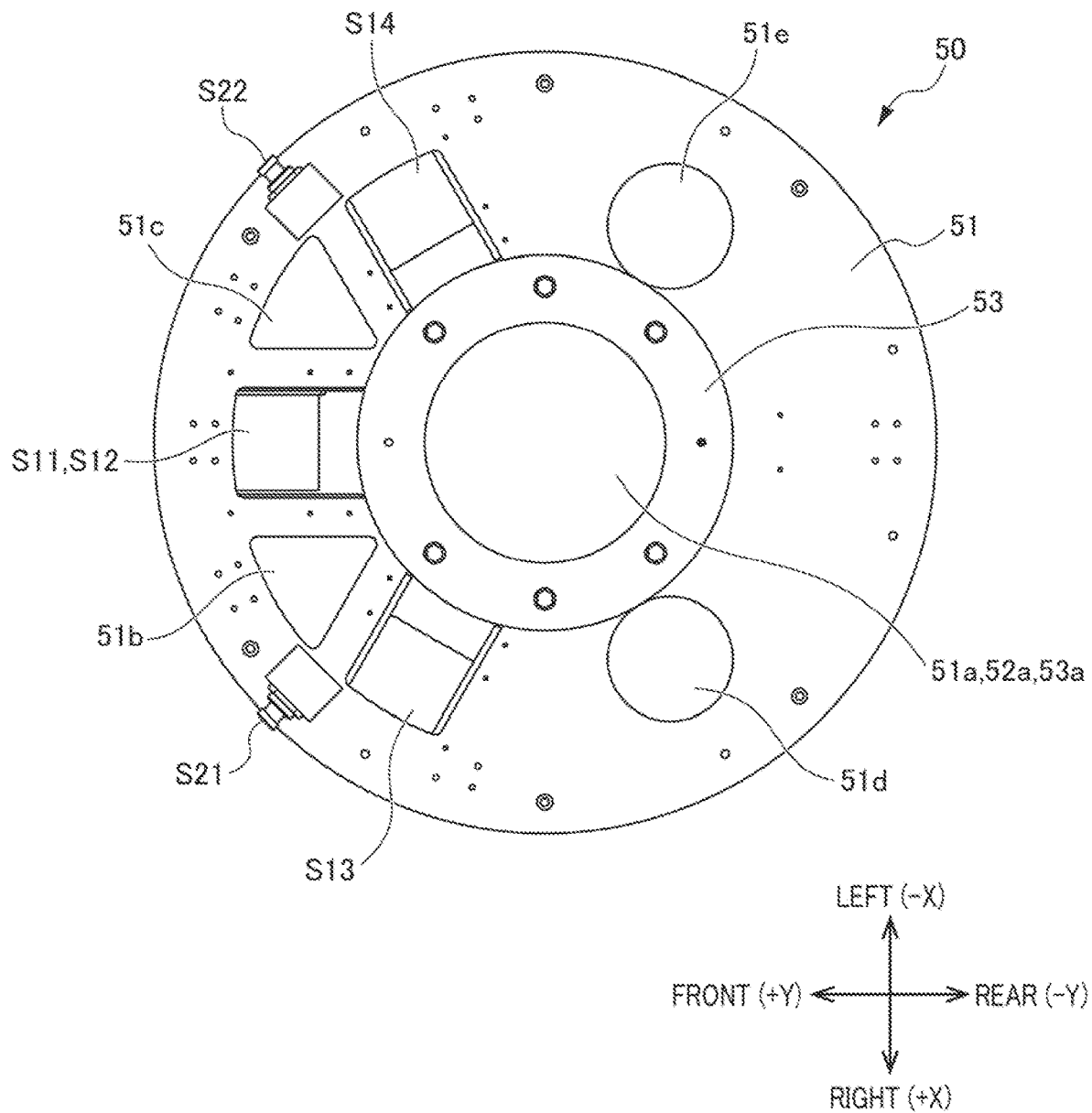
FIG. 10 is a bottom view of a base 50 having various sensors attached thereto.
Figure 11:
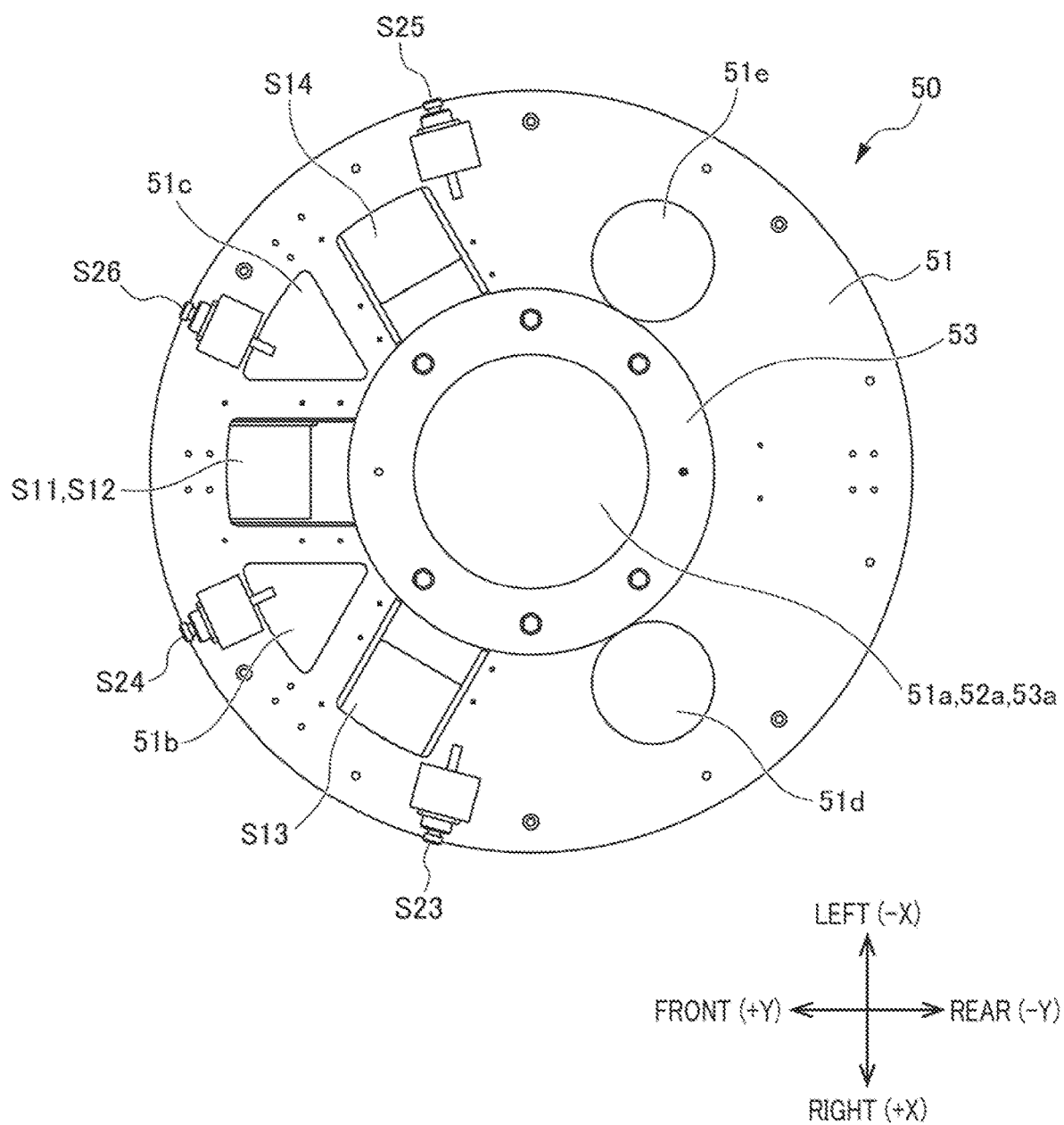
FIG. 11 is a bottom view of the base 50 having the various sensors attached thereto, and illustrates a modification of second sensors.
Figure 12:
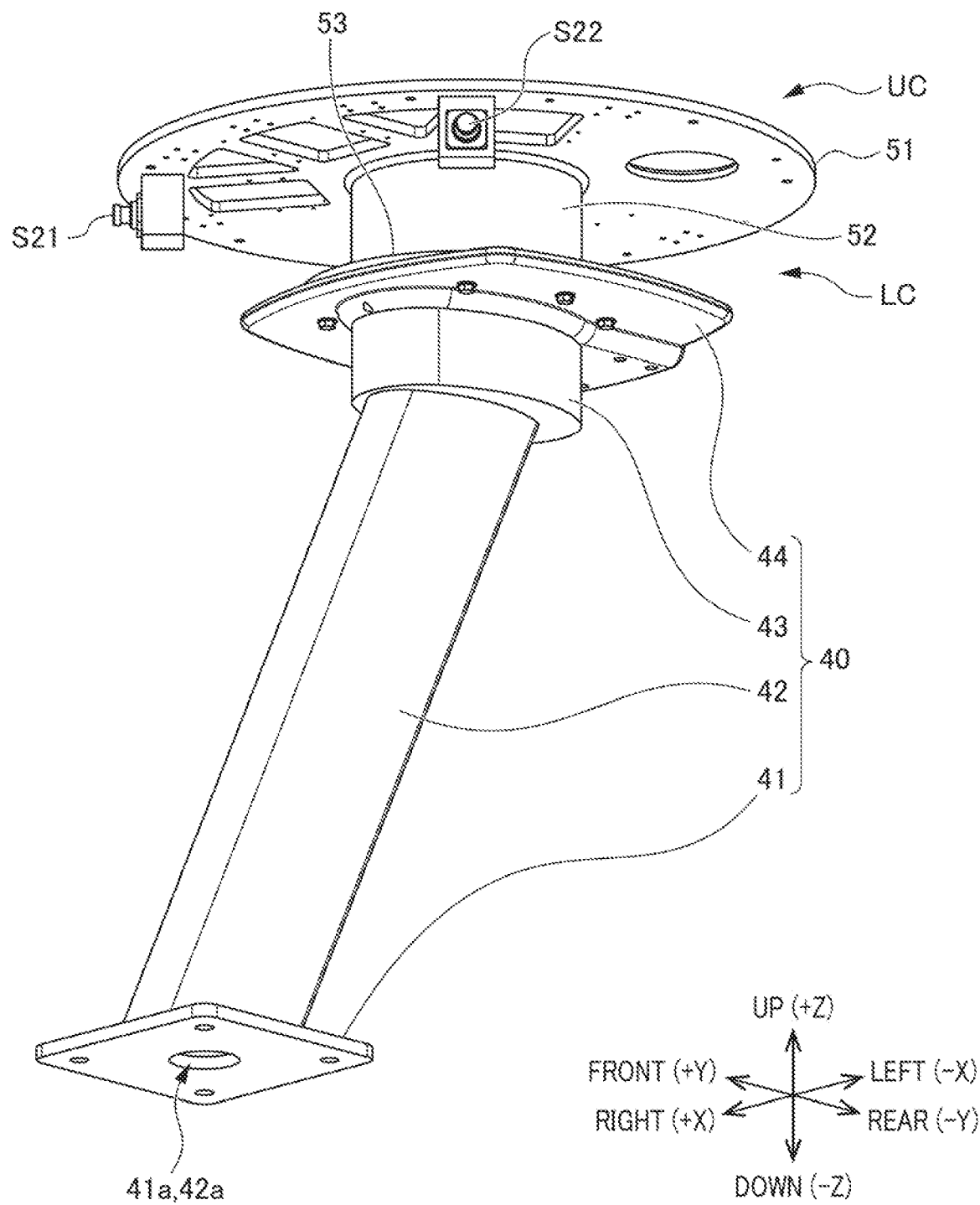
FIG. 12 illustrates the base 50 and a strut 40 as viewed obliquely from the front lower side.
Figure 14:
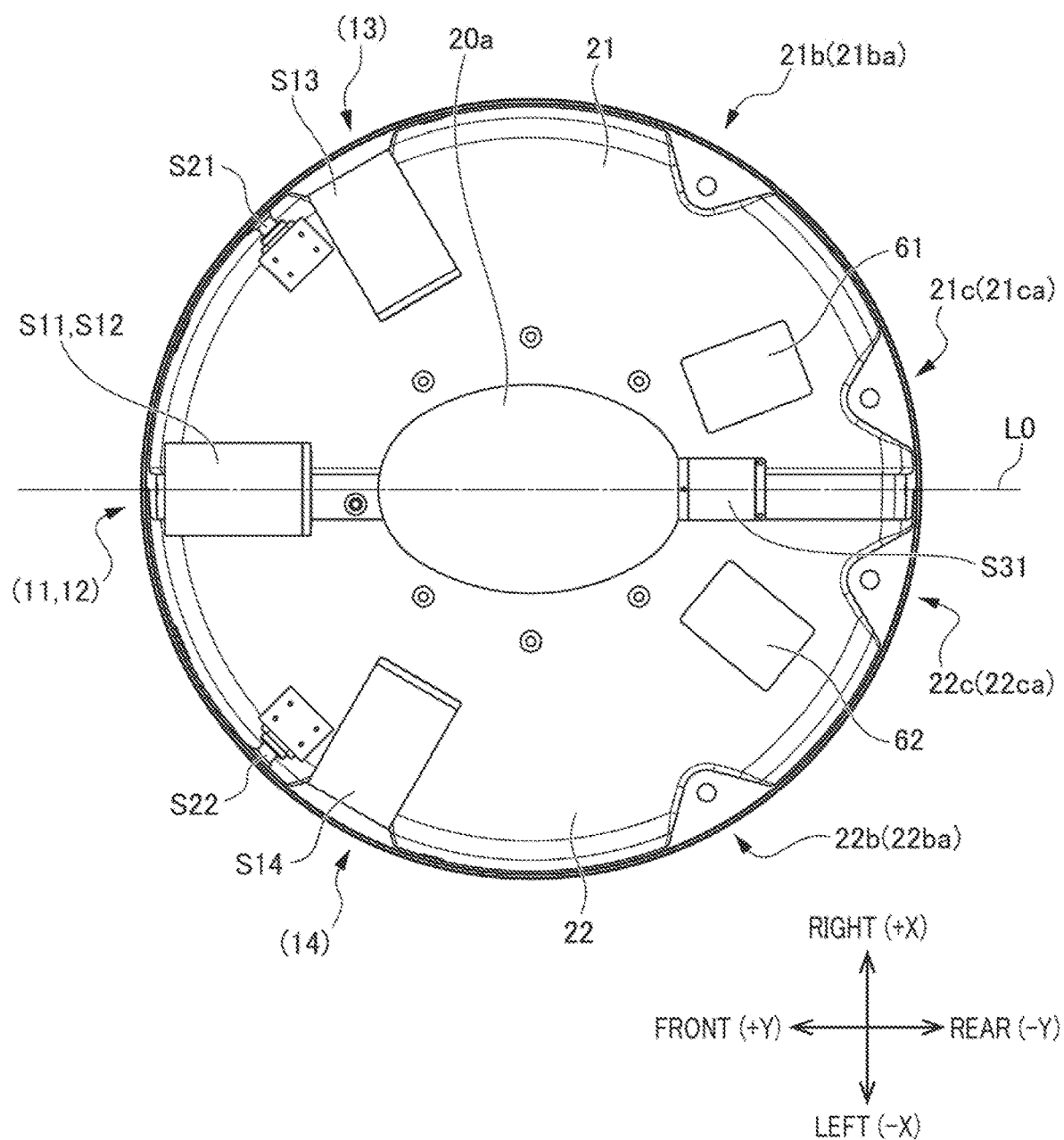
FIG. 14 is a top view illustrating an arrangement of the sensors.

FIG. 8 is a diagram illustrating a state in which the casing 30 has been removed, as viewed obliquely from the front upper side. FIG. 9 is a top view illustrating the state in which the casing 30 has been removed. FIG. 10 is a bottom view of the base 50 having various sensors attached thereto. FIG. 11 is a bottom view of the base 50 having the various sensors attached thereto, and illustrates a modification of second sensors. FIG. 12 illustrates the base 50 and the strut 40 as viewed obliquely from the front lower side. FIG. 13 illustrates the base 50 as viewed obliquely from the front lower side. FIGS. 12 and 13 illustrate second sensors S21 and S22 attached to the lower surface of the base body 51, as well. FIG. 14 is a top view illustrating an arrangement of the sensors. In FIG. 14, the upper casing part 10, the base 50, and the strut 40 are omitted. The base 50 having the various sensors attached thereto is provided in a space covered by the casing 30.

The base 50 includes a base body 51, a cylindrical part 52 provided on a lower side the base body 51, and a flange part 53 provided on a lower side of the cylindrical part 52. Each of the base body 51, the cylindrical part 52, and the flange part 53 may be made of metal, and the base body 51, the cylindrical part 52, and the flange part 53 may be connected to each other by welding, for example.

The base body 51 has a substantially disk plate shape. The base body 51 has, at the center thereof, a through hole 51a penetrating through the upper surface and the lower surface of the base 50. The cylindrical part 52 has a substantially cylindrical shape, and has therein a through hole 52a. The flange part 53 extends outward in a collar shape from a lower end of the cylindrical part 52, and has a through hole 53a that opens at the center thereof. The through hole 51a, the through hole 52a, and the through hole 53a communicate with each other.

The strut 40 is attached to a lower side of the flange part 53 of the base 50. The strut 40 includes a mounting part 41, a strut body 42 extending upward with respect to the mounting part 41, an elliptical tubular part 43 attached to an upper side of the strut body 42, and a flange part 44 attached to an upper side of the elliptical tubular part 43. Each of the mounting part 41, the strut body 42, the elliptical tubular part 43, and the flange part 44 may be made of metal, and the mounting part 41, the strut body 42, the elliptical tubular part 43, and the flange part 44 may be connected to each other by welding, for example.

The mounting part 41 has a rectangular flat plate shape when viewed from below, and has a strut through hole 41a opening at the center thereof. The mounting part 41 is detachably attached to a roof or the like of the marine vessel using screws or the like. The strut body 42 has a columnar shape, extends substantially in the up-down direction, and has therein a strut through hole 42a penetrating through the strut body 42 in the up-down direction. The elliptical tubular part 43 has a substantially elliptical tubular shape, and has therein a strut through hole 43a penetrating through the elliptical tubular part 43 in the up-down direction. The flange part 44 extends outward in a collar shape from an upper end of the elliptical tubular part 43, has a strut through hole 44a opening substantially at the center thereof. The strut through hole 41a, the strut through hole 42a, the strut through hole 43a, and the strut through hole 44a communicate with each other. The flange part 44 is fixed to the flange part 53 of the base 50 using screws or the like. The strut through hole 44a of the strut 40 communicates with the through hole 53a of the base 50. Thus, a space is formed which continues from the upper surface of the base 50 to a lower end of the strut 40. In this space, wiring for transmitting signals from various sensors (to be described later) to a controller (not shown) installed in the marine vessel 100 is installed. This configuration eliminates the need for a waterproof structure or the like for waterproofing the wiring of the sensors, and can protect the wiring from sunlight and the like. Furthermore, since the wiring is not exposed to the outside, the appearance can be improved.

First sensors S11, S12, S13, and S14, a third sensor S31, and relays 61 and 62 are fixed to the upper surface of the base 50. In the present embodiment, the first sensors S11, S12, S13, and S14 are all light detection and ranging (LIDAR) sensors. The first sensors S11 and S12 are oriented in the front direction (+Y direction) of the marine vessel, and the first sensor S11 is disposed on top of the first sensor S12. The first sensor S13 is oriented substantially 60 degrees diagonally to the right. The first sensor S14 is oriented substantially 60 degrees diagonally to the left.

The third sensor S31 of the present embodiment is an inertial measurement unit (IMU). The third sensor S31 extends in the length direction of the marine vessel 100 and is arranged on a virtual line segment L0 (see FIGS. 9 and 14) passing through the center of the base 50, while being spaced apart from the first sensors in a top view. This arrangement makes it possible to reduce the calculation cost of calculating a motion state of the marine vessel by combining the first sensors S11 to S14 and the third sensor S31.

The relays 61 and 62 relay signals from the first sensors S11 to S14, second sensors S21 and S22 (to be described later), the third sensor S31, and the like. That is, the signals from the sensors are inputted to the relays 61 and 62 via wiring (not shown). The relays transmit the signals to the controller (not shown) of the marine vessel 100 through the interior of the above-described strut 40 by way of wiring different from the wiring from the sensors. With this configuration, even if the wiring from the sensors is short, it can be used for the sensor module 1.

The second sensors S21 and S22 are provided on the lower surface of the base body 51. The second sensor S21 is oriented substantially 45 degrees diagonally to the right. The second sensor S22 is oriented substantially 45 degrees diagonally to the left. The second sensors S21 and S22 of the present embodiment are cameras (imagers) each including an imaging element and a lens.

As shown in FIG. 11, in the sensor module 1 of the present embodiment, second sensors S23, S24, S25 and S26 having specifications different from those of the second sensors S21 and S22 may be disposed instead of the second sensors S21 and S22. For example, the second sensors S21 and S22 may be cameras having a wider angle of view than the second sensors S23, S24, S25, and S26. In the case of using the second sensors S23, S24, S25, and S26, a different lower casing part 20 having apertures positionally corresponding to the second sensors S23, S24, S25, and S26 is used, although the different lower casing part 20 is not shown. In the following, the second sensors S21 and S22 are mainly described, but the description of the second sensors S21 and S22 applies to the case where the second sensors S23, S24, S25, and S26 are used.

As described above, the first sensors S11 to S14, the second sensors S21 and S22, and the third sensor S31 are all fixed to the base body 51. For this reason, mounting errors of the sensors can be reduced at the time of manufacturing, in comparison with the conventional configuration in which the sensors are fixed to different base members, thereby enabling improvement of the mounting accuracy. Furthermore, making only the base 50 have sufficient rigidity allows for preventing the sensors from deviating from the relative positions, so that the casing 30 can be made of a material having low rigidity such as a resin component. The sensors having a small mounting error at the time of manufacturing can be put in use thereafter for automatic navigation, etc. without need for measuring the positions of the sensors or the need for calibration.

The first sensors S11, S12, S13, and S14 are heavier in weight than the second sensors S21 and S22. For this reason, in the present embodiment, the first sensors S11, S12, S13, S14, which are heavier in weight than the second sensors S21 and S22, and the third sensor S31 are arranged and stably held on the upper surface of the base body 51, and upper portions of the second sensors S21 and S22, which are relatively light in weight, are fixed to the lower surface of the base body 51. This arrangement, in which the sensors are not in contact with the bottom surface of the casing 30, makes it possible to prevent the sensors from being immersed in water even in case of ingress of water into the casing 30. Since the second sensors S21 and S22 having a relatively light weight are attached to the lower surface of the base body 51, a simple attachment structure can be used for the second sensors S21 and S22. Furthermore, the base body 51 entirely covers the upper portions of the second sensors S21 and S22 and thereby functions as an eave to block sunlight. As a result, the second sensors S21 and S22 can easily obtain good photographing results, and erroneous recognition, identification errors, and the like can be reduced.

In the top view (and the bottom view), the first sensors S11, S12, S13 and S14 and the second sensors S21 and S22 are arranged axisymmetrically with respect to the virtual line segment L0 (see FIGS. 9 and 14), which extends in the length direction (Y direction) of the marine vessel 100 and passes through the center of the base 50 in the top view. Thus, an even arrangement is achieved, making it possible to evenly perform detection in the horizontal direction. Furthermore, good weight balance can be achieved.

In the top view (and the bottom view), the first sensors S11, S12, S13, and S14 and the second sensors S21 and S22 are arranged at positions where the first and second sensors do not overlap with each other. This arrangement makes it possible to avoid interference between bolts and the like for attaching the sensors to the base body 51, and removes an impediment to attaching the sensors in a pitch direction (circumferential direction in the top view).

The base body 51 has, separately from the through hole 51a described above, communication holes 51b, 51c, 51d, and 51e through which the upper chamber UC communicates with the lower chamber LC. Due to the communication holes 51b, 51c, 51d and 51e, the wiring of the second sensors S21 and S22 arranged in the lower chamber LC can be inserted into the through hole 51a or connected to the relays 61 and 62. The communication holes 51b, 51c, 51d, and 51e further have a function of allowing air to flow between first ventilation portions 21ba, 21ca, 22ba, and 22ca and second ventilation portions 11, 12, 13, and 14, which will be described later.

Figure 15:
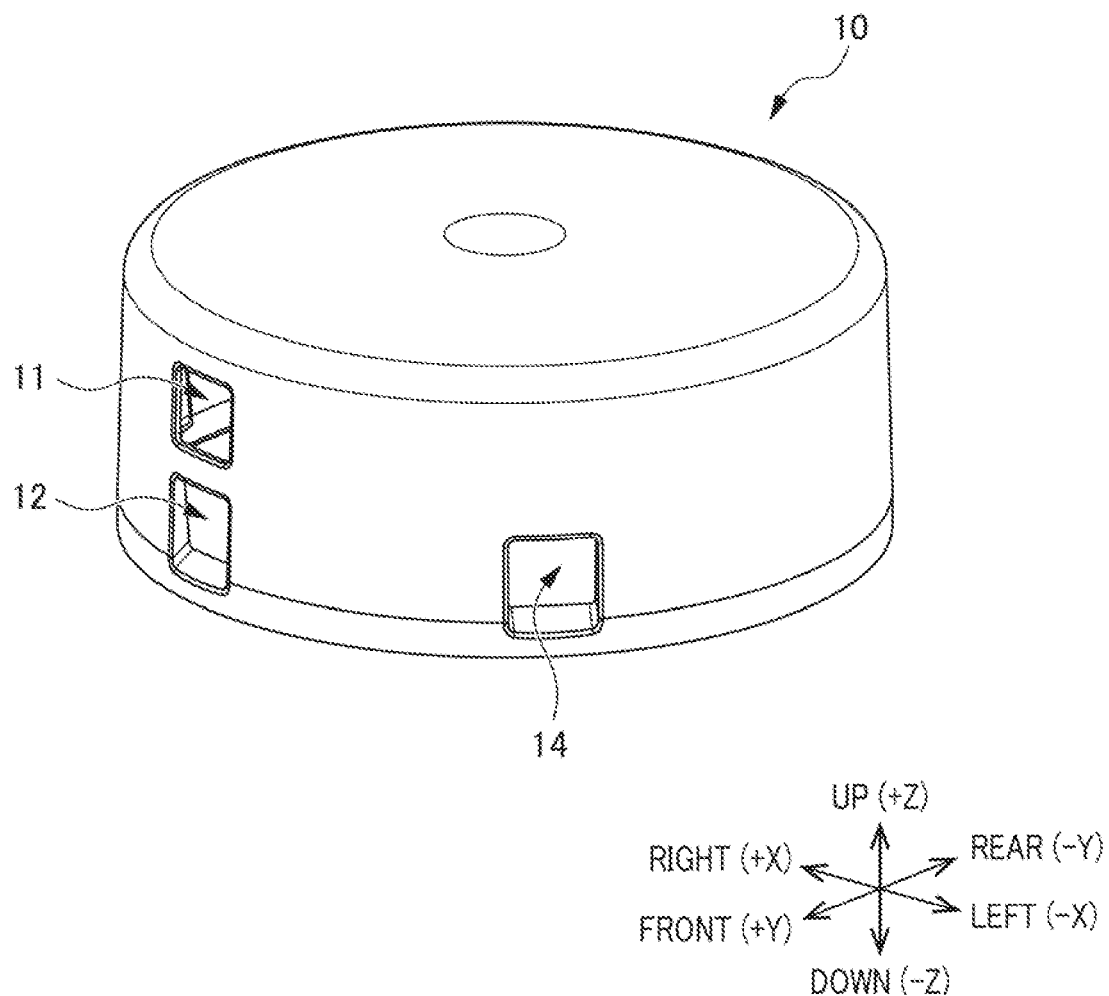
FIG. 15 illustrates an upper casing part 10 as viewed obliquely from the front upper side.
Figure 16:
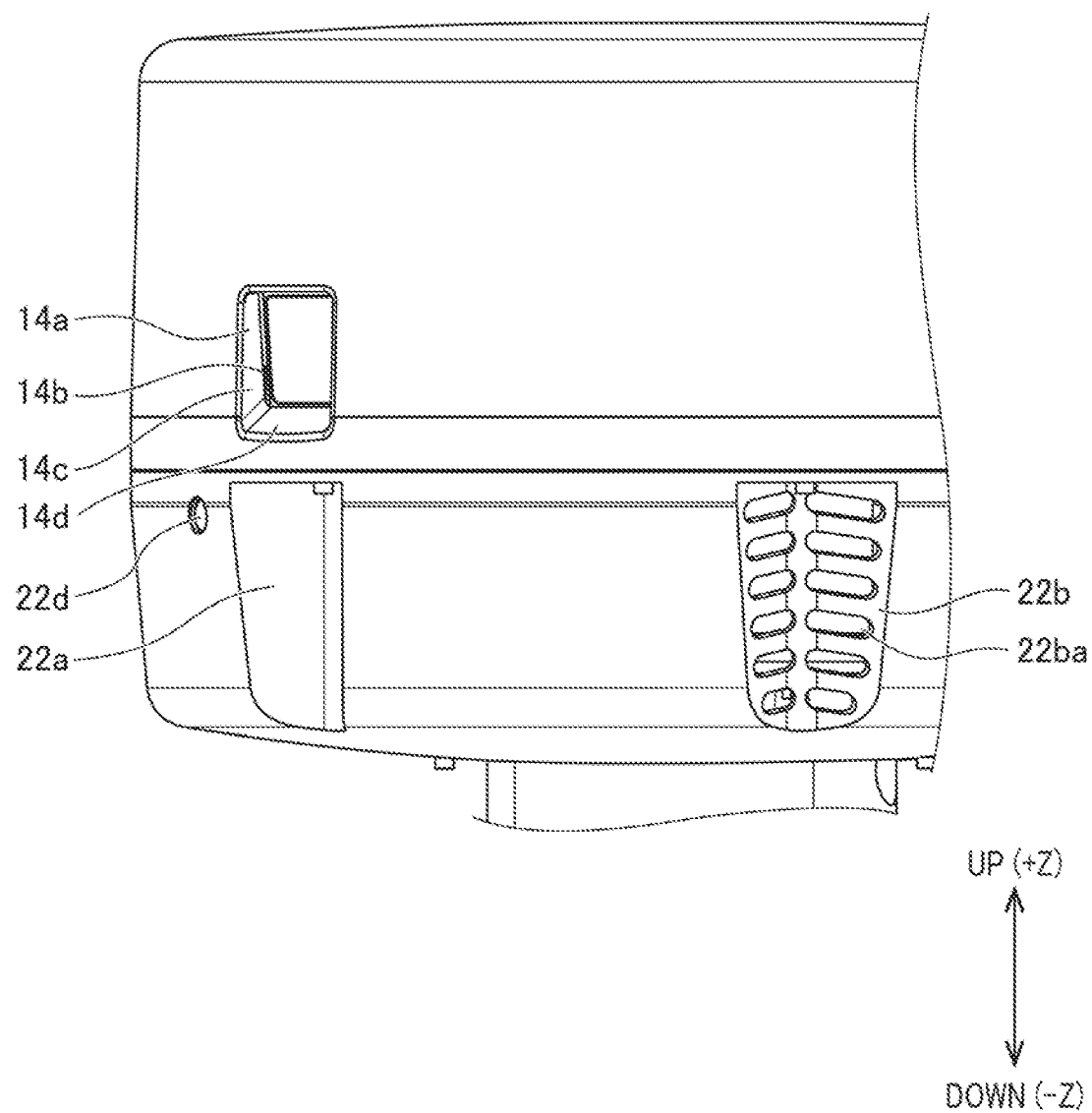
FIG. 16 illustrates, at an enlarged scale, the vicinity of a second ventilation portion 14 of the sensor module 1.
Figure 18:
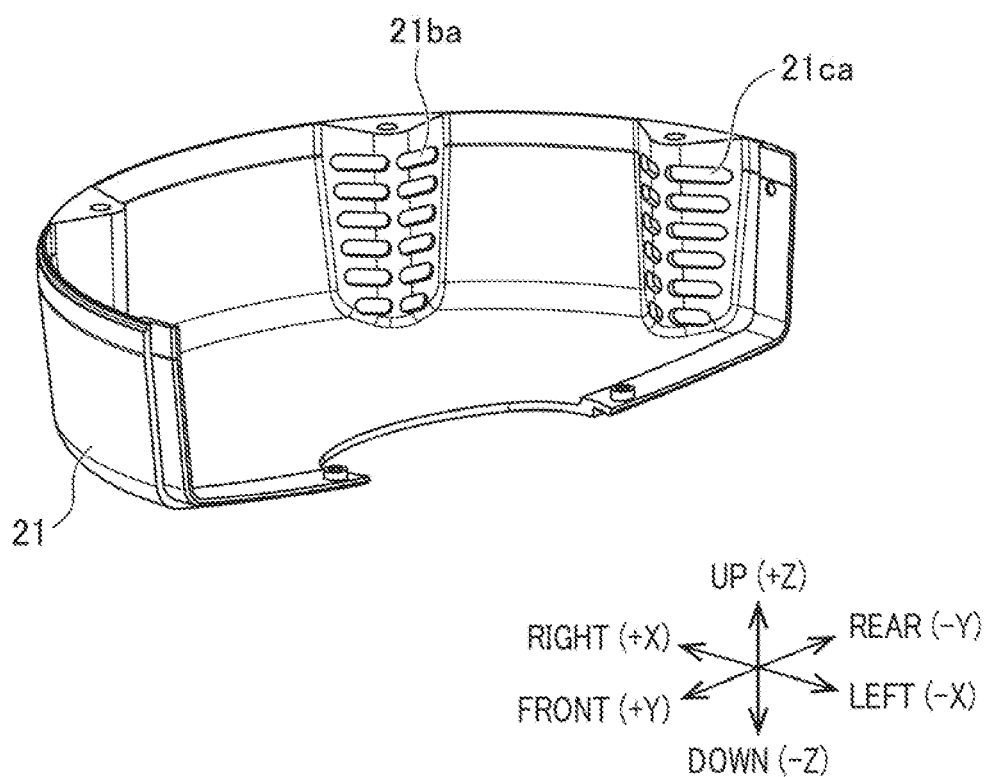
FIG. 18 illustrates a first lower casing component 21 as viewed obliquely from the front upper side.

FIG. 15 illustrates the upper casing part 10 as viewed obliquely from the front upper side. FIG. 16 illustrates, at an enlarged scale, the vicinity of the second ventilation portion 14 of the sensor module 1. FIG. 17 illustrates the lower casing part 20 as viewed obliquely from the front upper side. FIG. 18 illustrates the first lower casing component 21 as viewed obliquely from the front upper side.

The second ventilation portions 11, 12, 13, and 14 are provided on the side wall of the upper casing part 10 at positions opposite to the first sensors S11, S12, S13, and S14, respectively. The second ventilation portions 11, 12, 13, and 14 have a function as apertures through which the first sensors S11, S12, S13, and S14 perform sensing, and a function of ventilation for cooling the first sensors S11, S12, S13, and S14. Accordingly, a gap is provided between the second ventilation portions 11, 12, 13, and 14 and the first sensors S11, S12, S13, and S14, respectively.

The second ventilation portion 14 includes an external opening 14a, an internal opening 14b, an opening side surface 14c, and an opening bottom surface 14d. The external opening 14a opens at the surface of the side wall of the upper casing part 10. The internal opening 14b opens more inside the upper casing part 10 than the external opening 14a. The opening side surface 14c connects the external opening 14a to the internal opening 14b, and extends substantially in the up-down direction. The opening bottom surface 14d connects the external opening 14a to the internal opening 14b, and extends in a direction inclined upward from the external opening 14a toward the internal opening 14b. Due to this configuration of the second ventilation portion 14, even if rainwater or the like runs down the side wall of the upper casing part 10 to the second ventilation portion 14, the opening bottom surface 14d that is inclined upward toward the interior makes it unlikely for the rainwater or the like to ingress into the casing 30, while the gap necessary for ventilation is ensured. The second ventilation portions 12 and 13 have the same or similar configuration to that of the second ventilation portion 14.

As described above, the lower casing part 20 is composed of two components, i.e., the first lower casing component 21 and the second lower casing component 22, and is detachably attachable to the base 50. The first lower casing component 21 has recesses 21a, 21b, and 21c, and the second lower casing component 22 has recesses 22a, 22b, and 22c (see, for example, FIG. 7). The recesses 21a, 21b, 21c, 22a, 22b, and 22c are formed by recessing portions of the side wall of the first lower casing component 21 or the second lower casing component 22 toward the interior of the lower casing part 20, are positioned below the base body 51, and are arranged at positions where the recesses partially overlap with the base body 51 in a top view. Ceiling surfaces of the recesses 21a, 21b, 21c, 22a, 22b, and 22c each overlap with the base body 51, and screws are fastened in the overlapping portions, whereby the first lower casing component 21, the second lower casing component 22, the base body 51, and the upper casing part 10 are fixed together.

The first lower casing component 21 and the second lower casing component 22 have second sensor apertures 21d and 22d, respectively at positions corresponding to the second sensors S21 and S22. The second sensor apertures 21d and 22d of the present embodiment are openings of a size necessary for the second sensors S21 and S22 to photograph.

The lower casing part 20 has, in the lower surface thereof, a drain hole 20a having an elliptical shape similar to the perimetrical shape of the elliptical tubular part 43 of the strut 40. The perimetrical shape of the drain hole 20a is slightly larger than the perimetrical shape of the elliptical tubular part 43, and a gap is formed between the edge of the drain hole 20a and the elliptical tubular part 43 (see FIG. 7). This gap has a function of draining water, and in case of ingress of water into the interior of the casing 30, water is automatically drained through the gap. A drain hole may be formed at a different position.

The first ventilation portions 21ba, 21ca, 22ba, and 22ca that allow for ventilation between the interior and the exterior are provided on the side walls of the recesses 21b, 21c, 22b and 22c, which are provided in a rear portion. The first ventilation portions 21ba, 21ca, 22ba, and 22ca, which are provided on the side wall of the casing 30, constitute a ventilation structure that makes it unlikely for rainwater to ingress from above. In particular, in the present embodiment, the first ventilation portions 21ba, 21ca, 22ba, and 22ca, which are provided on the side walls of the recesses 21b, 21c, 22b and 22c, make it further unlikely for rainwater to ingress. Furthermore, since the recesses 21b, 21c, 22b, and 22c each have the ceiling portion that is formed by the first lower casing component 21 or the second lower casing component 22 and the base body 51, it is possible to prevent the recesses 21b, 21c, 22b, and 22c from getting wet with water coming from above.

In a top view, the first ventilation portions 21ba, 21ca, 22ba, and 22ca are provided on the circumference on which the first sensors S11, S12, S13, and S14, are arranged, and are arranged at positions substantially opposite to the second ventilation portions 11, 12, 13, and 14. Specifically, in the top view, the first ventilation portion 21ba is substantially opposite to the second ventilation portion 14, the first ventilation portions 21ca and 22ca are substantially opposite to the second ventilation portions 11 and 12, and the first ventilation portion 22ba is substantially opposite to the second ventilation portion 13. To show this arrangement, in FIG. 14, the positions of the first ventilation portions 21ba, 21ca, 22ba, and 22ca and the positions of the second ventilation portions 11, 12, 13, and 14, are indicated by the respective reference signs in parentheses. The communication holes 51b, 51c, 51d, and 51e allow air to flow between the first ventilation portions 21ba, 21ca, 22ba, and 22ca and the second ventilation portions 11, 12, 13, and 14. Due to this arrangement of the ventilation portions, the sensor module 1 of the present embodiment has air passages formed in the casing 30, thereby making it possible to efficiently cool the sensors, in particular, the first sensors S11, S12, S13, and S14. Furthermore, since the arrangement of the ventilation portions allows wind to easily pass through, generation of abnormal sound due to the wind can be reduced even when it is very windy.

Figure 19:
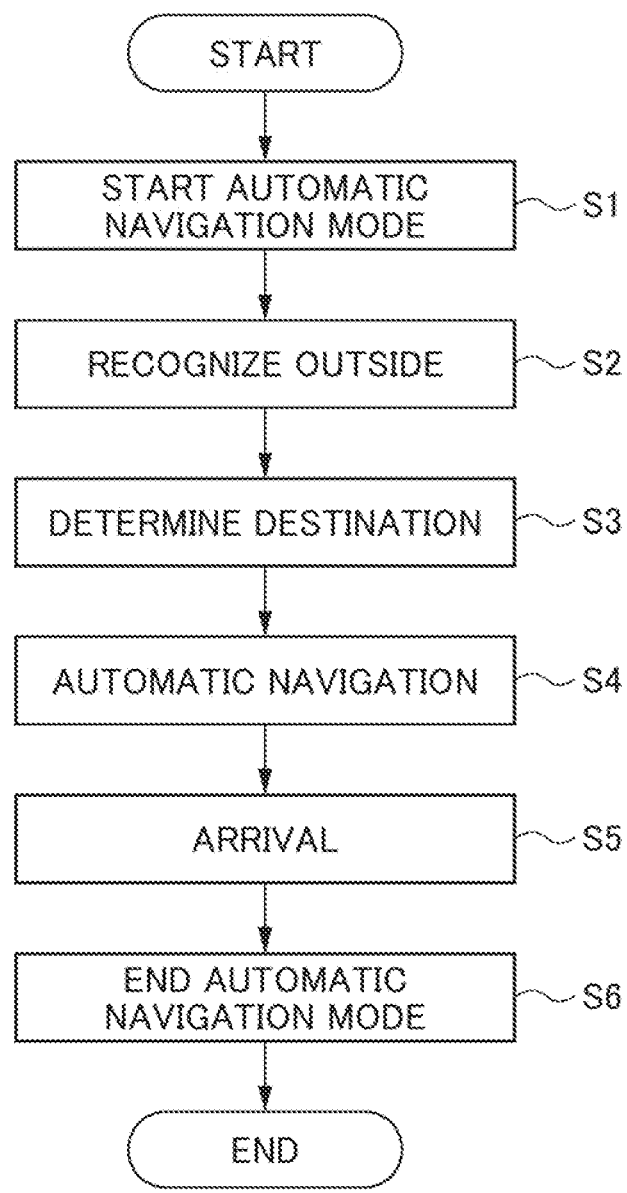
FIG. 19 is a flowchart illustrating an outline of automatic navigation control of the marine vessel 100.

The sensor module 1 of the present embodiment can be used, for example, for automatic navigation of the marine vessel 100. FIG. 19 is a flowchart illustrating an outline of automatic navigation control of the marine vessel 100. In step (hereinafter abbreviated as S) 1, the automatic navigation mode is started. In S2, the outside is recognized. The recognition of the outside is performed by mainly using the first sensors S11, S12, S13, S14, the second sensors S21, S22, and the like installed in the sensor module 1. Next, in S3, a destination is determined. The destination may be, for example, a specific position of a pier at which the marine vessel is going to arrive. In response to the determination of the destination in S3, automatic navigation is performed in S4. Also at this time, the first sensors S11, S12, S13, S14, the second sensors S21, S22, the third sensor S31, and the like installed in the sensor module 1 are used, and information from a global positioning system (GPS) sensor or the like (not shown) is additionally used. Upon arrival at the destination in S5, the automatic navigation mode then ends in S6.

As described above, according to the sensor module 1 of the present embodiment, since all the sensors are arranged on the base body 51, assembly errors between the plurality of sensors can be reduced, thereby eliminating the need for measuring the distances between the sensors and the need for a system for calibration.

Modifications

The above embodiment is not intended to limit the present disclosure, and various modifications and variations may be made, which are also encompassed in the scope of the present disclosure.

Figure 20:
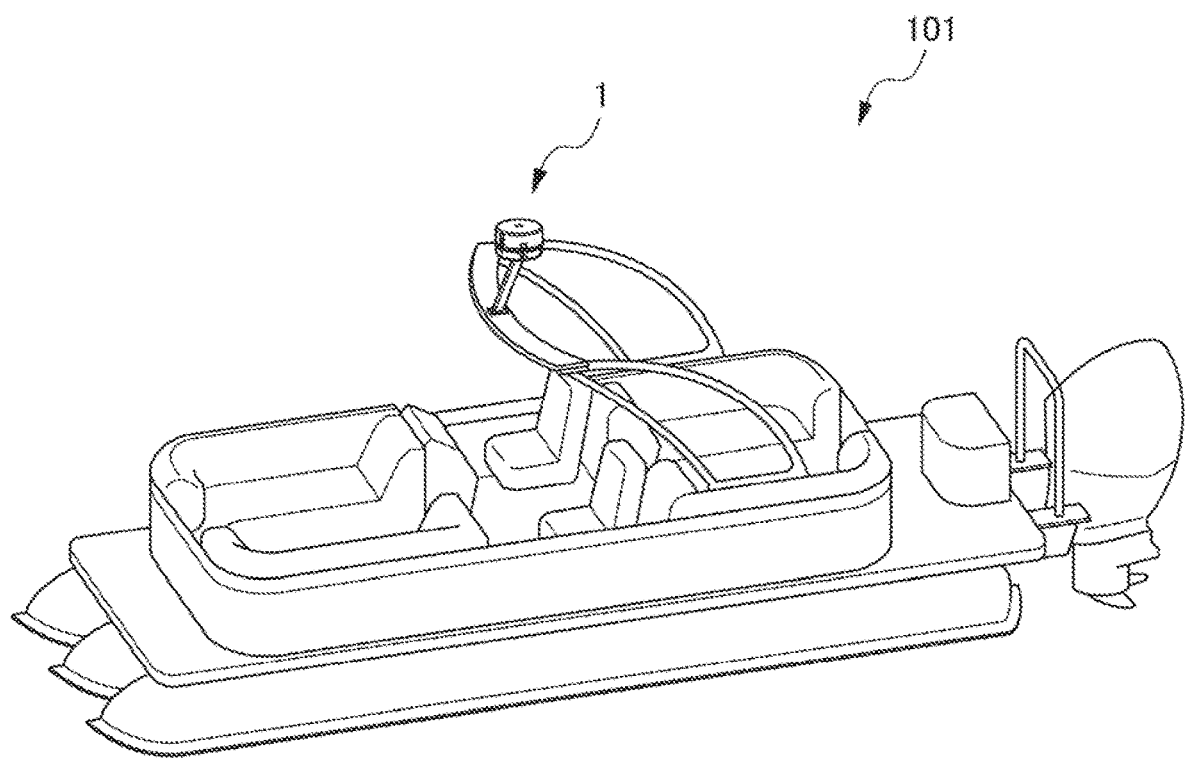
FIG. 20 illustrates a modification of the marine vessel.

(1) FIG. 20 illustrates a modification of the marine vessel. In the above embodiment, the boat is illustrated in FIG. 1 as an example of the marine vessel 100. The boat is a non-limiting example, and the sensor module 1 of the present disclosure may be mounted to a marine vessel 101 called a pontoon ship as illustrated in FIG. 20, for example.

(2) In the above embodiment, the specific types and arrangements of the sensors are exemplified, but these may be changed as appropriate. For example, the first sensors may be configured as cameras, and the second sensors may be configured as LIDAR sensors, or additional first and second sensors may be arranged in the rear portion.

(3) In the above embodiment, the example in which the sensor module 1 is mounted to face the front of the body of the marine vessel has been described. This is a non-limiting example, and the sensor module 1 may be mounted to face the rear of the body of marine vessel. In this case, the first sensors S11 and S12 may be oriented in a frontal direction (−Y) of the rear of the marine vessel.

(4) In the above embodiment, the example in which the sensor module 1 is mounted to face the front of the body of the marine vessel has been described. This is a non-limiting example, and the sensor module 1 may be mounted to face in the width direction of the body of the marine vessel. In this case, it is desirable that the first sensors S11 and S12 be oriented in the +X direction and the −X direction.

It should be noted that the embodiment and the modifications can be appropriately combined to be used, but detailed description of such combinations is omitted herein. The present disclosure is not limited to the embodiments described above.

EXPLANATION OF REFERENCE NUMERALS

1: Sensor module
10: Upper casing part
11, 12, 13, 14: Second ventilation portion
14a: External opening
14b: Internal opening
14c: Opening side surface
14d: Opening bottom surface
20: Lower casing part
20a: Drain hole
21: First lower casing component
22: Second lower casing component
21a, 21b, 21c, 22a, 22b, 22c: Recess
21ba, 21ca, 22ba, 22ca: First ventilation portion
21d, 22d: Second sensor aperture
30: Casing
40: Strut
41: Mounting part
41a: Strut through hole
42: Strut body
42a: Strut through hole
43: Elliptical tubular part
43a: Strut through hole
44: Flange part
44a: Strut through hole
50: Base
51: Base body
51a: Through hole
51b, 51c, 51d, 51e: Communication hole
52: Cylindrical part
52a: Through hole
53: Flange part
53a: Through hole
61, 62: Relay
100, 101: Marine vessel
S11, S12, S13, S14: First sensor
S21, S22, S23, S24, S25, S26: Second sensor
S31: Third sensor
L0: Virtual line segment
LC: Lower chamber
UC: Upper chamber

What is claimed is:

1. A sensor module for shipboard use, the sensor module being detachably mountable to a marine vessel and comprising:
a base;
a casing that covers the base, the case including an upper casing part and a lower casing part, wherein the upper casing part configures an upper chamber surrounded by the base and the upper casing part and the lower casing part configures a lower chamber surrounded by the base and the lower casing part;
a first sensor provided on an upper surface of the base in the upper chamber; and
a second sensor, an upper portion of the second sensor being fixed to the lower surface of the base in the lower chamber,
wherein the casing includes at least one first ventilation portion that allows for ventilation on a side wall of the casing, and
the base has a communication hole through which the upper chamber communicates with the lower chamber.

2. The sensor module according to claim 1, wherein the first sensor is heavier in weight than the second sensor.

3. The sensor module according to claim 2, wherein the second sensor is an imager.

4. The sensor module according to claim 1, wherein the first sensor comprises a plurality of first sensors, and the second sensor comprises a plurality of second sensors, and
in a top view, at least part of the first sensors and at least part of the second sensors are arranged axisymmetrically with respect to a virtual line segment extending in a length direction of the marine vessel to which the sensor module is to be mounted and passing through a center of the base in the top view.

5. The sensor module according to claim 1, wherein the first sensor and the second sensor are arranged at positions where the first and second sensors do not overlap with each other in a top view.

6. The sensor module according to claim 1, wherein the first ventilation portion is provided in a recess that is a portion of the side wall recessed toward an interior direction of the casing.

7. The sensor module according to claim 6, wherein the recess is arranged below the base, at a position where the recess partially overlaps with the base in a top view.

8. The sensor module according to claim 1, wherein at least one of the first sensor or the second sensor is provided on a front portion of the base, the front portion corresponding to a front in a front-rear direction of a marine vessel to which the sensor module is to be mounted, and
the sensor module includes on the side wall of the casing, a second ventilation portion that allows for ventilation, the second ventilation portion being arranged at a position opposite to the at least one of the first sensor or the second sensor arranged on the front portion.

9. The sensor module according to claim 8, wherein the first sensor comprises a plurality of first sensors that are arranged on a circumference in a top view,
the second ventilation portion comprises a plurality of second ventilation portions that are arranged opposite to the plurality of first sensors, respectively, and
the first ventilation portion comprises a plurality of first ventilation portions that are arranged on the circumference on which the plurality of first sensors are arranged in the top view, and are disposed at positions substantially opposite to the plurality of second ventilation portions.

10. The sensor module according to claim 8, wherein the second ventilation portion comprises:
an external opening that opens at a surface of the side wall of the casing;
an internal opening that opens more inside the casing than the external opening;
an opening side surface that connects the external opening to the internal opening and extends substantially in an up-down direction; and
an opening bottom surface that connects the external opening to the internal opening and extends in a direction inclined upward from the external opening toward the internal opening.

11. The sensor module according to claim 7, wherein the first sensor is a light detection and ranging (LIDAR) sensor.

12. The sensor module according to claim 11, wherein an inertial measurement unit is provided as a third sensor on the upper surface of the base, and at least one of a plurality of the first sensor is spaced apart from the third sensor on a virtual line segment extending in a length direction of the marine vessel and passing through a center of the base in a top view.

13. The sensor module according to claim 1, further comprising:
a strut that is attached to the base, and has a strut through hole penetrating through an interior of the strut, wherein
the base has a through hole penetrating through the upper surface and the lower surface of the base, and
the through hole and the strut through hole communicate with each other.

14. The sensor module according to claim 13, wherein
the upper casing part arranged above the base, and
the lower casing part arranged below the base,
the communication hole is formed separately from the through hole.

15. The sensor module according to claim 14, wherein
the lower casing part has a drain hole through which the strut penetrates and which opens with a gap between the drain hole and the strut.

16. The sensor module according to claim 1, wherein
a relay that relays an electrical connection to at least one of the first sensor or the second sensor is arranged on the base.

17. A marine vessel equipped with the sensor module according to claim 1.

* * * * *